United States Patent
Hiraga

[19]

[11] Patent Number: 5,963,527
[45] Date of Patent: Oct. 5, 1999

[54] OPTICAL DISK RECORDING AND REPRODUCING APPARATUS

[75] Inventor: Takayoshi Hiraga, Yokosuka, Japan

[73] Assignee: Kabushiki Kaisha Kenwood, Tokyo, Japan

[21] Appl. No.: 08/873,745

[22] Filed: Jun. 12, 1997

Related U.S. Application Data

[63] Continuation of application No. 08/514,997, Aug. 14, 1995, abandoned.

[30] Foreign Application Priority Data

Aug. 18, 1994 [JP] Japan .................................. 6-216513

[51] Int. Cl.⁶ .................................................. G11B 33/02
[52] U.S. Cl. ............................................. 369/75.2
[58] Field of Search ................................. 369/75.2, 77.2, 369/270, 77.1; 360/99.05

[56] References Cited

U.S. PATENT DOCUMENTS

| | | | |
|---|---|---|---|
| 4,607,361 | 8/1986 | Schuitmaker et al. | 369/75.2 |
| 5,050,159 | 9/1991 | Kenmotsu | 369/270 |
| 5,107,475 | 4/1992 | Serita et al. | 369/39 |
| 5,109,372 | 4/1992 | Caspers et al. | 369/75.2 |

FOREIGN PATENT DOCUMENTS

| | | |
|---|---|---|
| 0437091 | 7/1991 | European Pat. Off. . |
| 0518259 | 12/1992 | European Pat. Off. . |
| 0526204 | 2/1993 | European Pat. Off. . |
| 0528420 | 2/1993 | European Pat. Off. . |
| 0576253 | 12/1993 | European Pat. Off. . |
| 0616322 | 9/1994 | European Pat. Off. . |
| 0632441 | 1/1995 | European Pat. Off. . |
| 61-206962 | 9/1986 | Japan . |
| 5-41061 | 2/1993 | Japan . |
| 5-274763 | 10/1993 | Japan . |

*Primary Examiner*—David D. Davis
*Attorney, Agent, or Firm*—Sixbey, Friedman, Leedom & Ferguson, PC; Eric J. Robinson

[57] ABSTRACT

A reproducing apparatus compatible with both CD and MD. First and second cartridge holding members are rotatably supported by a cover unit between a position where MD is held on a turntable and a position where the holding members are retracted not to contact CD held between the turntable and a clamper. The clamper is movable between a position where CD is clamped to the turntable and a position where the clamper is retracted not to contact MD held on the turntable. An optical pickup movably supported by a main unit reproduces both CD and MD.

11 Claims, 21 Drawing Sheets

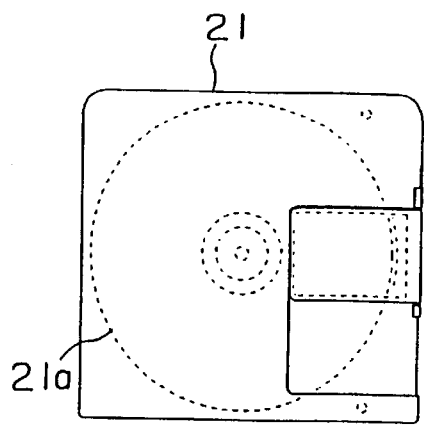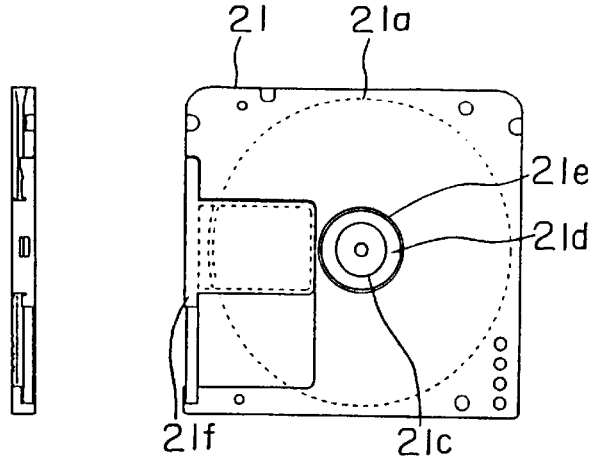
FIG. 17A  FIG. 17C  FIG. 17B
FIG. 17D
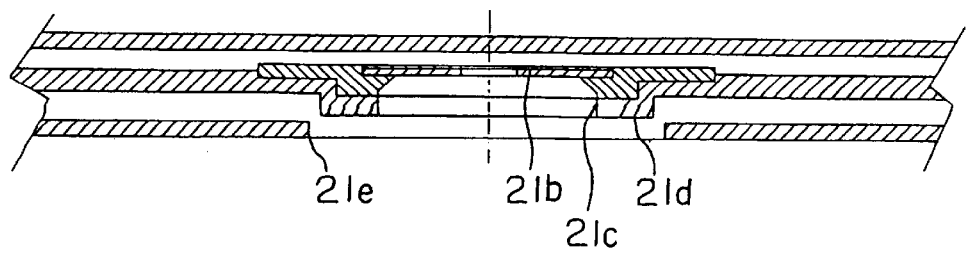
FIG. 18

OPTICAL DISK RECORDING AND REPRODUCING APPARATUS

This application is a Continuation of Ser. No. 08/514,997, filed Aug. 14, 1995, now abandoned.

BACKGROUND OF THE INVENTION

1. Field of the Invention

The present invention relates to an optical disk recording and reproducing apparatus, and more particularly to an apparatus for recording and reproducing both an optical disk housed in a cartridge or a so-called mini disk and an optical disk not housed in a cartridge, by using the same disk motor and the same optical pickup.

2. Related Background Art

A mini disk (MD) is known as a rewritable optical disk, and a recording/reproducing apparatus for MD only is commercially available. A compact disk (CD) is also known which is an optical disk only for reproduction, and a reproducing apparatus for only CD and a reproducing apparatus compatible with both CD and other optical disks such as video disks are also commercially available.

In both CD and MD, an optical pickup applies a laser spot to the record track and receives the reflected light with a light receiving element whose output is used for reproduction.

However, CD and MD have the following different points. An optical disk of MD is housed in a cartridge. It is rotated by using the hole formed in the disk and recorded or reproduced by opening the shutter of the cartridge. An optical disk of CD is not however housed in a cartridge.

An optical disk of MD is held by a turntable having a magnet which attracts the metal plate attached to the optical disk. However, CD has no such a metal plate so that it is held by a turntable by pressing it against the turntable.

Although position alignment holes are formed in both CD and MD at the central area thereof, the hole of CD is larger than that of MD. In addition, although the hole of CD is a through hole, the hole of MD is a via hole closed at its upper end by the metal plate.

As above, although CD and MD have the same point that both are reproduced by using a reflected light of a laser spot, the disk structure and holding mechanism are different. Therefore, the optical disk holding and driving mechanism of a conventional optical disk recording and reproducing apparatus cannot hold and drive both MD and CD. A reproducing apparatus compatible with both MD and CD and capable of reproducing them by using the same disk motor and optical pickup, has not been realized as yet.

SUMMARY OF THE INVENTION

The invention has been made under the above-described circumstances. It is an object of the present invention to provide an optical disk recording and reproducing apparatus capable of recording and reproducing both CD and MD by using the same turntable and optical pickup.

According to one aspect of the present invention, there is provided an optical disk recording and reproducing apparatus having a main unit fixedly mounting a disk motor and movably supporting an optical disk, and a cover unit being pivotally supported by the main unit between a close position for the reproduction of an optical disk and an open position for the load and unload thereof, wherein a turntable with a magnet for attracting an optical disk or a clamper is coupled to the shaft of the disk motor, the cover unit is provided with a clamper for clamping a first optical disk unable to be attracted by the magnet to the turn table and with first and second cartridge holding members for holding a second optical disk housed in a cartridge and able to be attracted by the magnet, the clamper is movable between a position where the first optical disk is held between the clamper and the turntable and a position where the clamper is retracted not to contact the second optical disk during reproduction, and the first and second cartridge holding members turn around between a position where the second optical disk is reproduced and a position where the holding members are retracted not to contact the first optical disk during reproduction.

According to another aspect of the present invention, there is provided an optical disk recording and reproducing apparatus having a housing frame for supporting a main unit and a cover unit movably back and forth, at least one of the main unit and the cover unit being movable in the vertical direction, the main unit fixedly mounting a disk motor at a predetermined position and movably supporting an optical disk, and the cover unit being pivotal between a position for covering the main unit and a position for moving apart from the main unit, wherein a turntable with a magnet for attracting an optical disk or a clamper is coupled to the shaft of the disk motor, the cover unit is provided with a clamper for clamping a first optical disk unable to be attracted by the magnet to the turn table and with first and second cartridge holding members for holding a second optical disk housed in a cartridge and able to be attracted by the magnet, the clamper is movable between a position where the first optical disk is held between the clamper and the turntable and a position where the clamper is retracted not to contact the second optical disk during reproduction, and the first and second cartridge holding members turn around between a position where the second optical disk is reproduced and a position where the holding members are retracted not to contact the first optical disk during reproduction.

In the optical disk recording and reproducing apparatus, a cam plate with a cam groove is rotatably mounted on the cover unit, and a cam follower mounted on at least one of the first and second cartridge holding members engages with the cam groove to rotate the holding members as the cam plate rotates.

In the optical disk recording and reproducing apparatus, a clamper slider for mounting the clamper thereon is supported by the cover unit in a slide manner, the clamper slider being driven by either the first cartridge member, the second cartridge member, or the cam plate.

In the optical disk recording and reproducing apparatus of this invention, as the first and second cartridge holding members on the cover unit are moved toward the center of the cover unit, the holding members can hold the second optical disk (MD). As the cover unit covers the main unit at a predetermined position, MD is attracted by the magnet of the turntable and rotated by the turntable.

As the cover unit covers the main unit at the predetermined position, the clamper on the cover unit is attracted by the turntable so that the first optical disk (CD) is held between the clamper and turntable and rotated by the turntable.

Both CD and MD are placed on the same turntable. When MD is held on the turntable, the movable ring lowers to determine the vertical position of MD. When CD is held on the turntable, the movable ring rises to determine the vertical position of CD. In this manner, the record surface of MD can be set at the same level as that of CD, so that the same optical pickup can be used both for MD and CD for recording and reproducing.

Since the clamper is made movable, it can be retracted not to contact MD during the reproduction of MD.

Similarly, since the first and second cartridge holding members are made rotatable, the holding members can be retracted not to contact CD during the reproduction of CD.

BRIEF DESCRIPTION OF THE DRAWINGS

FIG. 10B is a side view of the optical disk recording and reproducing apparatus showing some internal parts and the MD loaded state with the cover unit being closed.

FIG. 17A is a plan view of MD which the optical disk recording and reproducing apparatus reproduces, FIG. 17B is a rear view of MD, FIG. 17C is a side view of MD, and FIG. 17D is a cross sectional view of MD.

FIG. 18 is an enlarged cross sectional view showing the central area of MD.

DETAILED DESCRIPTION OF THE PREFERRED EMBODIMENTS

Embodiments of an optical disk recording and reproducing apparatus of this invention will be described with reference to the accompanying drawings.

Figure 1:
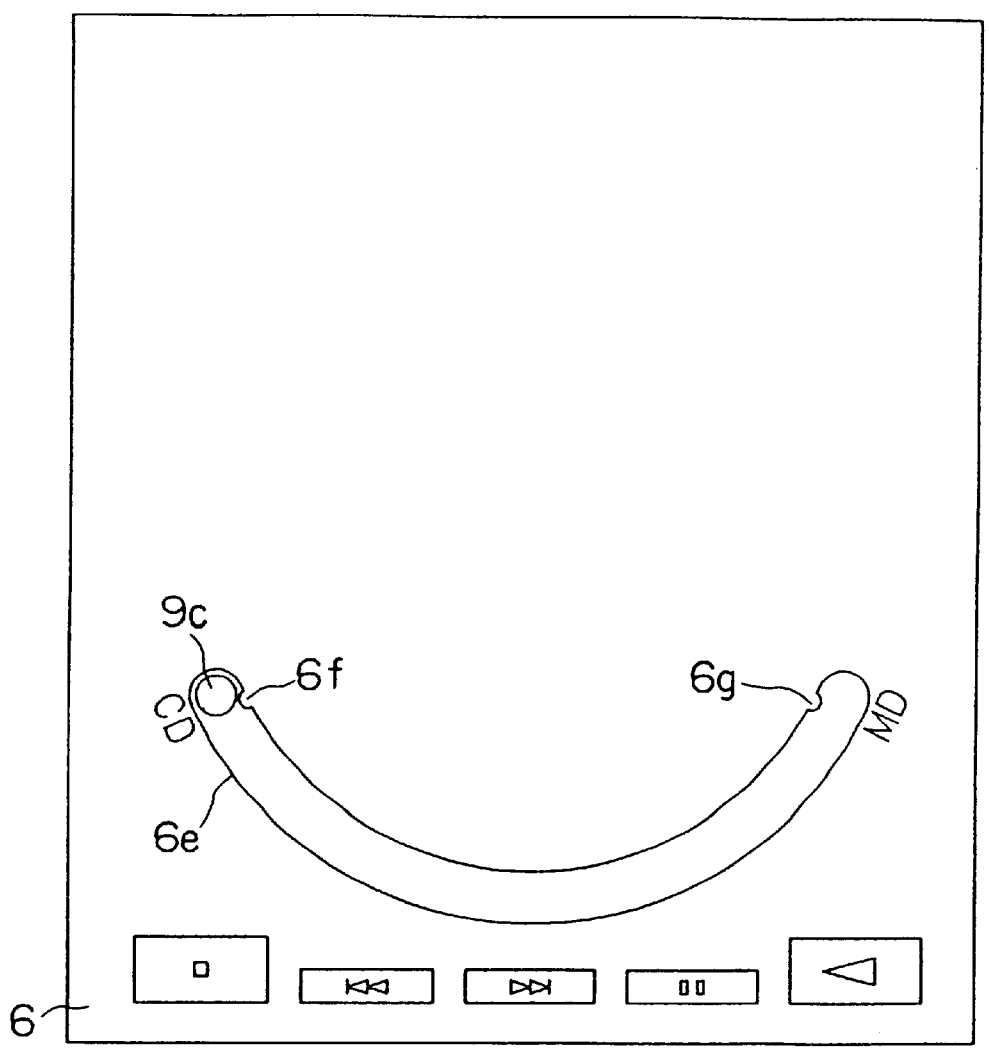
FIG. 1 is a plan view showing an optical disk recording and reproducing apparatus according to a first embodiment of the invention.
Figure 2:
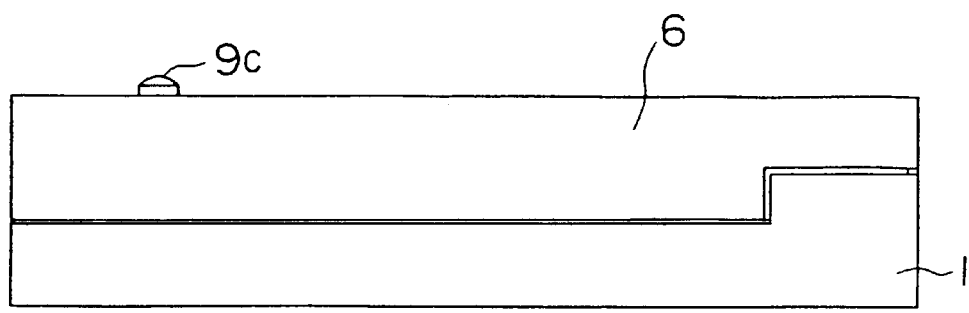
FIG. 2 is a side view of the optical disk recording and reproducing apparatus.
Figure 3A:
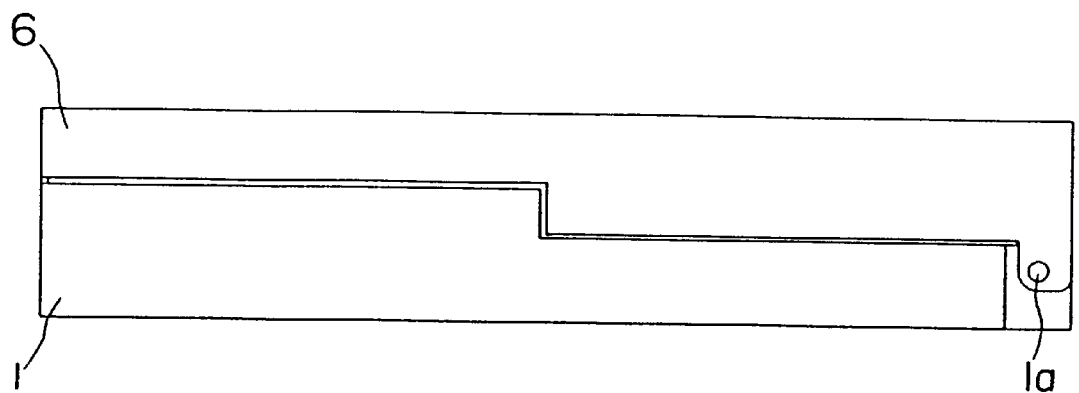
FIG. 3A is a side view of the optical disk recording and reproducing apparatus with its cover unit being closed.
Figure 3B:
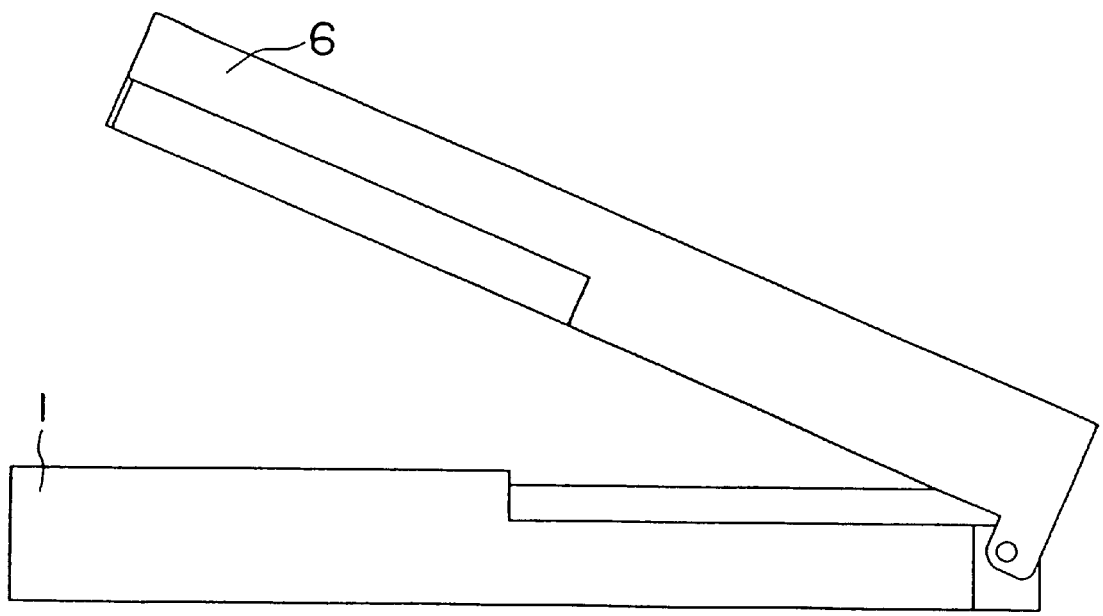
FIG. 3B is a side view of the optical disk recording and reproducing apparatus with its cover unit being opened.

FIGS. 1, 2, 3A, and 3B show the outer configuration of an optical disk recording and reproducing apparatus according to a first embodiment of the invention. Reference numeral 1 represents a main unit with a chassis and cabinet. A cover unit 6 is pivotally supported by a shaft 1a mounted on the main unit 1. The cover unit 6 pivots between a position where it is closed to cover the main unit 1 as shown in FIG. 3A and a position where it is opened as shown in FIG. 3B.

FIGS. 4, 5A, 5B, 6, 7A, and 7B show some internal parts of the optical disk recording and reproducing apparatus in a state able to load CD. Reference numeral 2 represents a disk motor which is fixed to the main unit 1. Mounted on the shaft of the disk motor 2 is a turntable which will be later described in detail. An optical pickup 4 is supported in a slide manner by shafts 5 and 5 fixed to the main unit 1. The optical pickup 4 is fed in a radial direction of an optical disk held by the turntable, by a feed mechanism not shown. Pins 1b, 1b, ... for the position alignment of an MD cartridge are mounted on the upper surface of the main unit 1.

First and second cartridge holding members 7 and 8 for holding an MD cartridge are rotatably supported by the cover unit 6. Specifically, the first cartridge holding member 7 is rotatably supported by a shaft 6a mounted on the cover unit 6, and the second cartridge holding member 8 is rotatably supported by a shaft 6b mounted on the cover unit 6.

The first cartridge holding member 7 has an fitting recess 7a for the engagement with an MD cartridge, and the second cartridge holding member 8 also has a similar fitting recess 8a.

A cam plate 9 of a disk type is disposed between the cover unit 6 and the first and second cartridge holding members 7 and 8, and rotatably supported by a shaft 6c mounted on the cover unit 6. The cam plate 9 is formed with cam grooves 9a and 9b. The cam groove 9a engages with a projection 7b formed on the first cartridge holding member 7, and the cam groove 9b engages with a projection 8b formed on the second cartridge holding member 8.

A support member 10 is fixed by projections 6d, 6d, . . . mounted on the cover unit 6, and disposed under the first and second cartridge holding members 7 and 8. Elongated holes 10a and 10a formed in the support member 10 engage with shafts 11a, 11a, . . . mounted on a clamper slider 11. The clamper slider 11 is supported by the support member 10 so as to allow it to move and be guided by the elongated holes 10a and 10a.

A shaft 11b mounted on the clamper slider 11 engages with an elongated hole formed in the second cartridge holding member 8, so that the clamper slider 11 moves as the second cartridge holding member 8 rotates. The clamper slider 11 supports a clamper 12 which will be later described in detail.

Figure 5A:
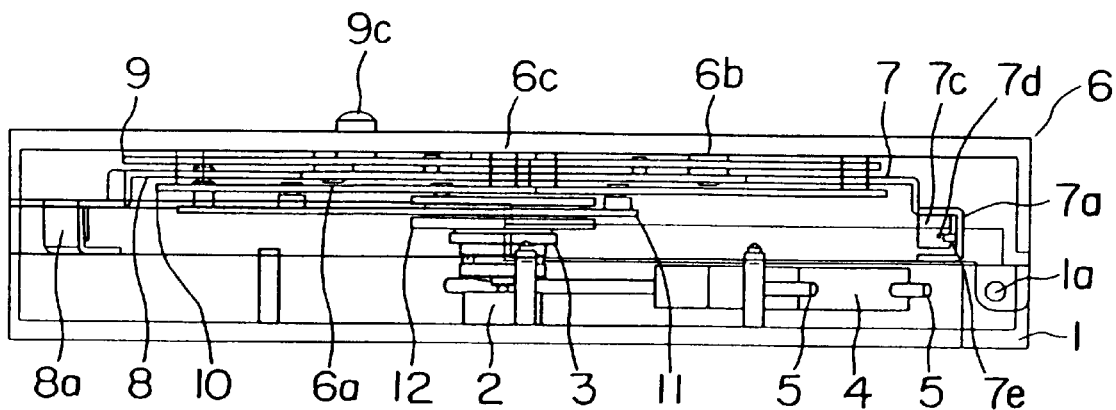
FIG. 5A is a side view showing some internal parts of the optical disk recording and reproducing apparatus with its cover unit being closed.
Figure 5B:
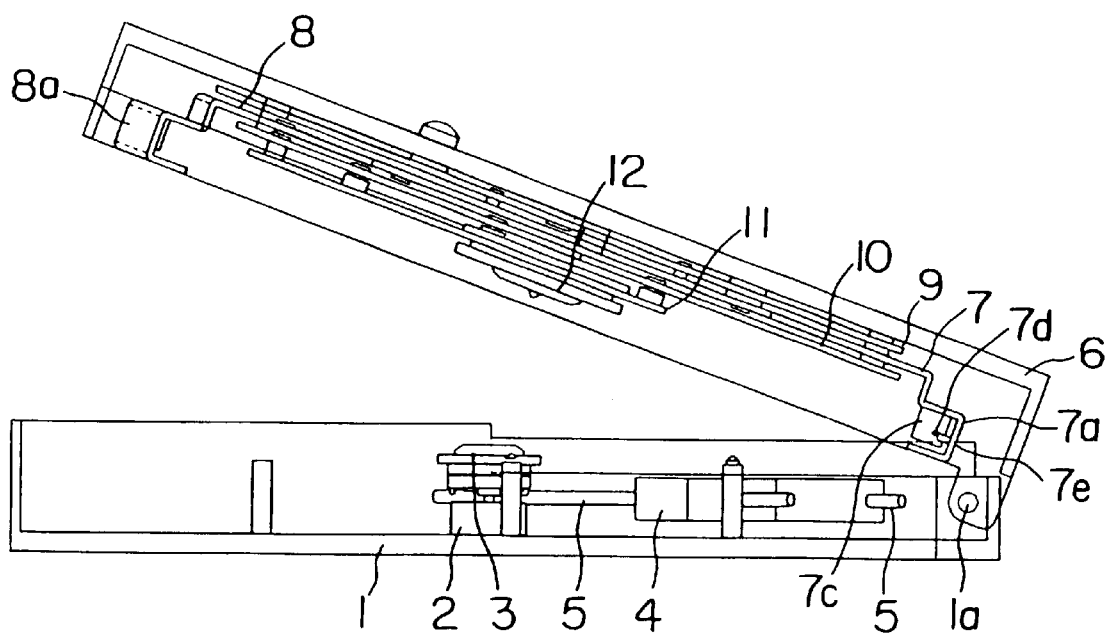
FIG. 5B is a side view showing some internal parts of the optical disk recording and reproducing apparatus with its cover unit being opened.

As shown in FIG. 5A, the motion range of the clamper slider 11 is set so as to allow the clamper 12 to move between a position where the clamper 12 is attracted by the turntable 3 and a position where the clamper 12 is retracted so as not to contact an MD cartridge held by the first and second cartridge holding members 7 and 8, respectively when the cover unit 6 is closed as shown in FIG. 5A.

A lever 9c is mounted on the cam plate 9 for manually rotating the cam plate 9. As shown in FIGS. 1 and 2, the lever 9c extends out of an arc slit 6e formed in the cover unit 6. Elastically deformable stoppers 6f and 6g are provided at opposite end portions of the arc slit 6e. These stoppers 6f and 6g hold the lever 9c at the end position (CD or MD position) of the arc slit 6e until a force greater than a predetermined value is applied to the lever 9c.

Figure 4:
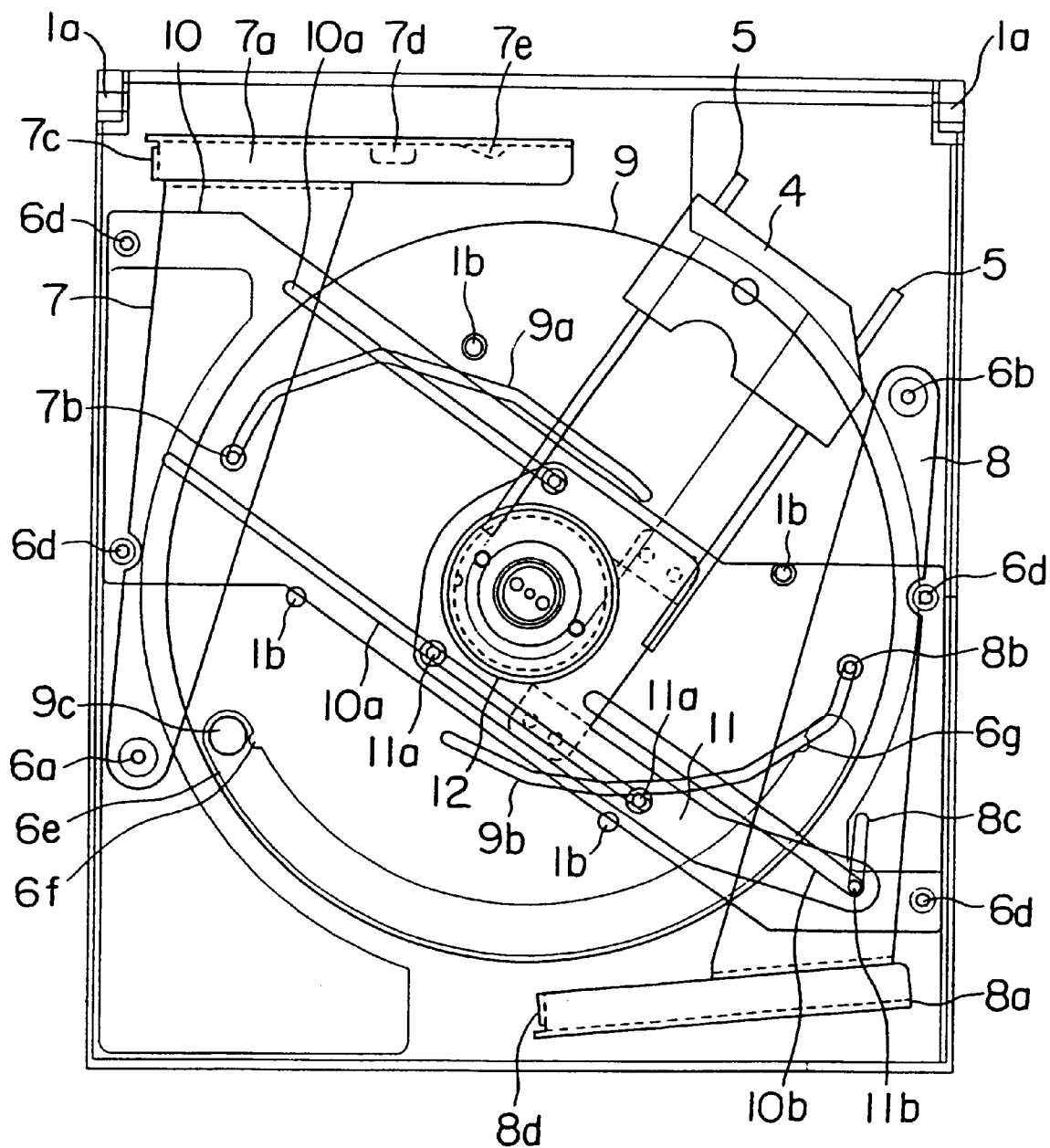
FIG. 4 is a plan view showing some internal parts of the optical disk recording and reproducing apparatus.

As shown in FIG. 4, the first and second cartridge holding members 7 and 8 are formed with stoppers 7c and 8d, respectively, for confining the position of an inserted MD cartridge. The fitting recess 7a of the first cartridge holding member 7 is provided with a claw 7d for opening the shutter of an MD cartridge and a convex member 7e for maintaining the shutter to be opened.

FIGS. 14A to 14D show the details of the turntable 3, clamper 12, and clamper slider 11. Reference alphanumeric symbol 2a represents the shaft of the disk motor 2. This shaft 2a is pressure-fitted in a hole of a lower fixing member 3a which is therefore made integral with the shaft 2.

A compression coil spring 3b is disposed at the circumference of the lower fixing member 3a. A movable member 3c is placed on the spring 3b to loosely couple the lower fixing member 3a. In this state, an upper fixing member 3d is fixed to the lower fixing member 3a by screws 3e. The movable member 3c is made movable between a position where the movable member 3c abuts on a circumferential lower surface 3f of the upper fixing member 3d and a position where the movable member 3c abuts on a pressure contact surface 3g of the lower fixing member 3a. As shown in FIG. 14D, the movable member 3c is usually made in pressure contact with the circumferential lower surface 3f of the upper fixing member 3d by an elasticity of the compression coil spring 3b.

An upper surface 3h and a lower surface 3i of the movable member 3c are parallel to the plane perpendicular to the disk motor shaft 2a. A ring magnet 3j is embedded in the upper portion of the upper fixing member 3d, and a position alignment hole 3k is formed in the central portion of the upper fixing member 3d. The hole 3k has an upper taper surface 3m and a lower cylindrical surface 3n. A taper surface 3p is formed at the upper circumferential portion of the upper fixing member 3d, and its upper surface 3q is parallel to the plane perpendicular to the disk motor shaft 2a.

Figure 14C:
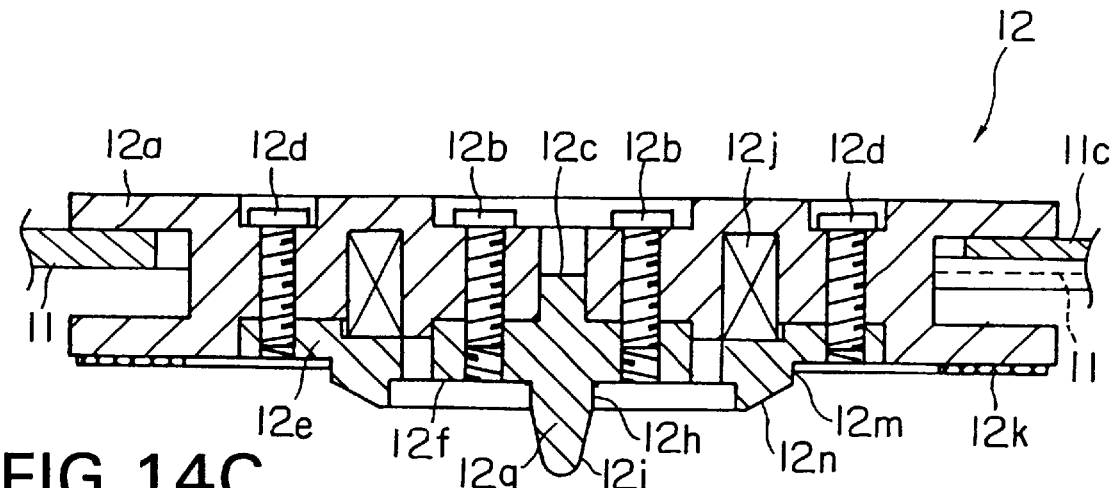
FIG. 14C is a cross sectional view of the clamper of the optical disk recording and reproducing apparatus.
Figure 14D:
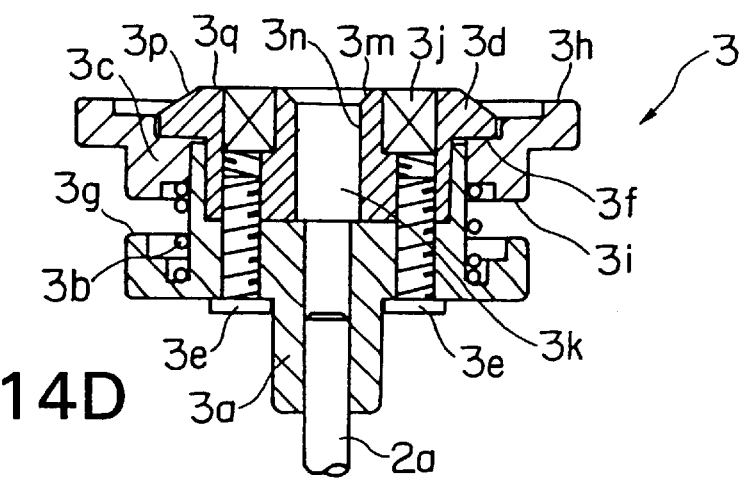
FIG. 14D is a cross sectional view of a turntable of the optical disk recording and reproducing apparatus.

The clamper 12 shown in FIG. 14C is constituted by a clamper main body 12a, an attraction member 12c attached to the main body 12a by screws 12b, and a disk position alignment member 12e attached to the main body 12a by screws 12d. The clamper main body 12a is held by the clamper slider 11.

A lower surface 12f of the attraction member 12c is adapted to be in tight contact with an upper surface 3q of the upper fixing member 3d. An apex member 12g is formed at the central portion of the attraction member 12c. The apex member 12g has a cylindrical portion 12h at its skirt and a taper portion 12i at its end. The cylindrical portion 12h is fitted in the hole of the upper fixing member 3d of the turntable 3, for the clamper position alignment, with a slight gap to the cylindrical surface 3n of the hole being given.

A magnet 12j is embedded in the clamper main body 12a at the lower portion thereof, the magnet 12j attracting the movable member 3c of the turntable 3 through the disk position alignment member 12e. A friction member 12k is adhered to the clamper main body 12a outwardly of the magnet 12j. The friction member 12k becomes in pressure contact with CD to impart a rotation force to CD. The disk position alignment member 12e has an engagement member 12m for engaging with the hole of CD and a taper guide portion 12n for guiding CD toward the engagement member 12m.

Figures 14A, 14B:
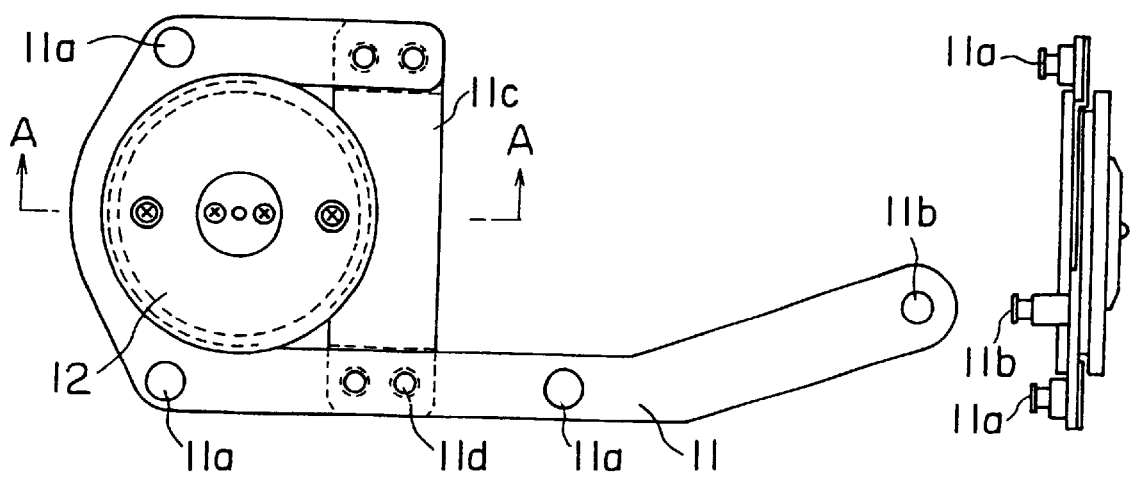
FIG. 14A is a plan view of the optical disk recording and reproducing apparatus with a clamper slider supporting a clamper.
FIG. 14B is a side view of the optical disk recording and reproducing apparatus with the clamper slider supporting the clamper.

FIGS. 14A and 14B show the state of the clamper slider 11 supported by the clamper 12. The clamper slider 11 has a shape that straight portions extend from a semicircular portion. The semicircular portion engages with a groove formed in the circumferential portion of the clamper 12, and a stopper 11c is fixed to the clamper slider 11 by screws 11d, 11d, . . . . In this state, the clamper 12 is loosely coupled to the clamper slider 11 and moved by the clamper slider 11, and thereafter it is positioned precisely by the turntable 3 as described earlier.

Figure 15A:
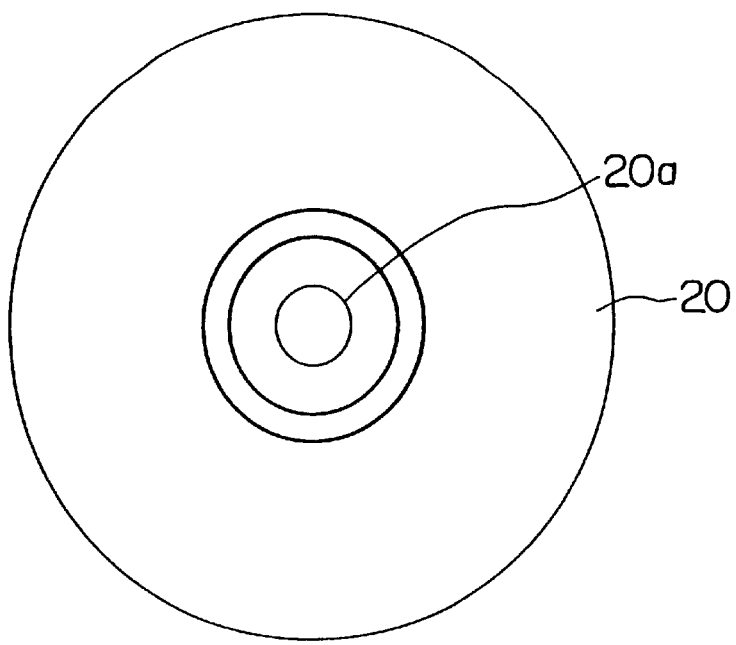
FIG. 15A is a plan view of CD which the optical disk recording and reproducing apparatus reproduces.
Figure 15B:
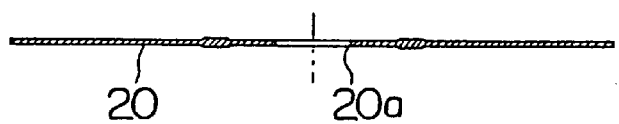
FIG. 15B is a cross sectional view of CD.
Figure 16:
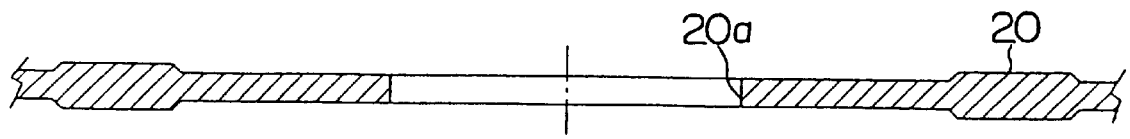
FIG. 16 is an enlarged cross sectional view showing the central area of CD.

FIGS. 15A, 15B, and 16 show CD to be held between the turntable and clamper. A position alignment hole 20a is formed in CD 20 at its central area. FIGS. 17A, 17B, 17C, and 18 show MD to be held by the turntable. MD 21a is housed in a cartridge 21.

The cartridge 21 has a hole 21e for holding MD 21a by the turntable, a shutter 21f for applying a laser beam from an optical pickup to MD 21a when it is opened, and a shutter for making a magnetic head in pressure contact with MD 21a.

Provided at the central area of MD 21a are a hole 21c for radial position alignment and a flange 21d for vertical position alignment. A metal plate 21b is embedded to cover the upper end of the hole 21c.

Next, how CD is held by the turntable and clamper will be described with reference to FIG. 19. The clamper main body 12a is positioned just above the turntable by the clamper slider 11.

Under this condition, CD 20 is placed on the upper surface 3h of the movable member 3c, with the hole 20a being generally concentric with the movable member 3c. The elasticity of the compression coil spring 3b is greater than the weight of the movable member 3c and CD 20 so that the movable member 3c is maintained to abut against the upper fixing member 3d.

Next, the cover unit is closed and the clamper main body 12a is lowered toward the turntable. The attraction member 12c is attracted by the magnet 3j so that the apex member 12g is fitted in the hole 3k and the clamper 12 is positioned concentrically with the disk motor shaft 2a. Since the cylindrical portion 12h of the apex member 12g tightly engages with the cylindrical surface 3n of the hole 3k, the clamper is prevented from being inclined.

Although CD 20 placed on the upper surface 3h of the movable member 3c is lowered by the clamper, the movable member 3c is raised by the compression coil spring 3b and attracted by the magnet 12j so that CD 20 is moved upward. Therefore, CD 20 is guided by the guide portion 12n of the disk position alignment member 12e, and the hole 20a engages with the engagement member 12m. The friction member 12k of the clamper becomes in pressure contact with CD 20.

In this manner, CD 20 is positioned concentrically with and perpendicular to the disk motor shaft 2a. The rotation force of the disk motor is transmitted to CD 20 by a friction force between the upper surface 3q of the upper fixing member 3d and the lower surface 12f of the attraction member 12c and by a friction force between the friction member 12k and the contact surface of CD 20 with the friction member 12k.

Next, how MD is held by the turntable will be described with reference to FIG. 20. In this case, the clamper is retracted by the clamper slider 11 so as not to contact MD held by the turntable.

A cartridge 21 housing therein MD 21a is held by the first and second cartridge holding members 7 and 8, as will be later described. As the cover unit 6 is closed, MD 21a is placed on the upper fixing member 3d as shown in FIG. 20.

At this time, the metal plate 21b of MD 21a is attracted by the magnet 3j. The hole 21c of MD 21a is guided by the taper surface 3p of the upper fixing member 3d and engages with the cylindrical portion thereof. The flange 21d of MD 21a pushes down the movable member 3c to a lower limit, against the elasticity of the compression coil spring 3b. Therefore, the pressure contact surface 3g of the lower fixing member 3a becomes in pressure contact with the lower surface 3i of the movable member 3c, and the upper surface 3h of the movable member 3c becomes in pressure contact with the flange 21d of MD 21a. In this manner, the position of MD 21a in the vertical direction is fixed, and the surface of MD 21a is made perpendicular to the disk motor shaft 2a.

The rotation force of the disk motor is transmitted to MD 21a held in the above manner, by a friction force between the pressure contact surface 3g of the lower fixing member 3a and the lower surface 3i of the movable member 3c and by a friction force between the upper surface 3h of the movable member 3c and the flange 21d of MD 21a.

Figure 19:
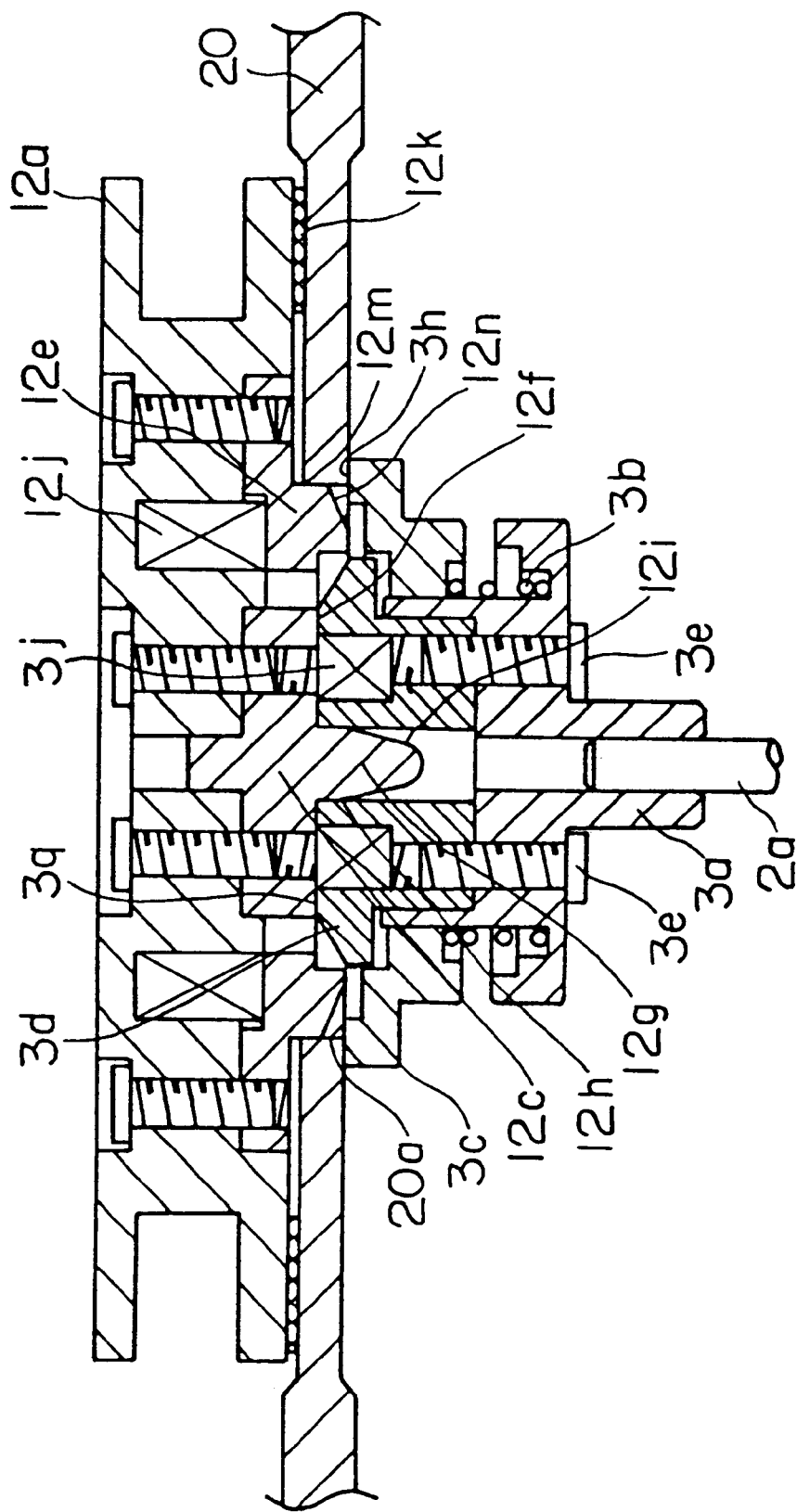
FIG. 19 is a cross sectional view showing the CD loaded state of the optical disk recording and reproducing apparatus.
Figure 20:
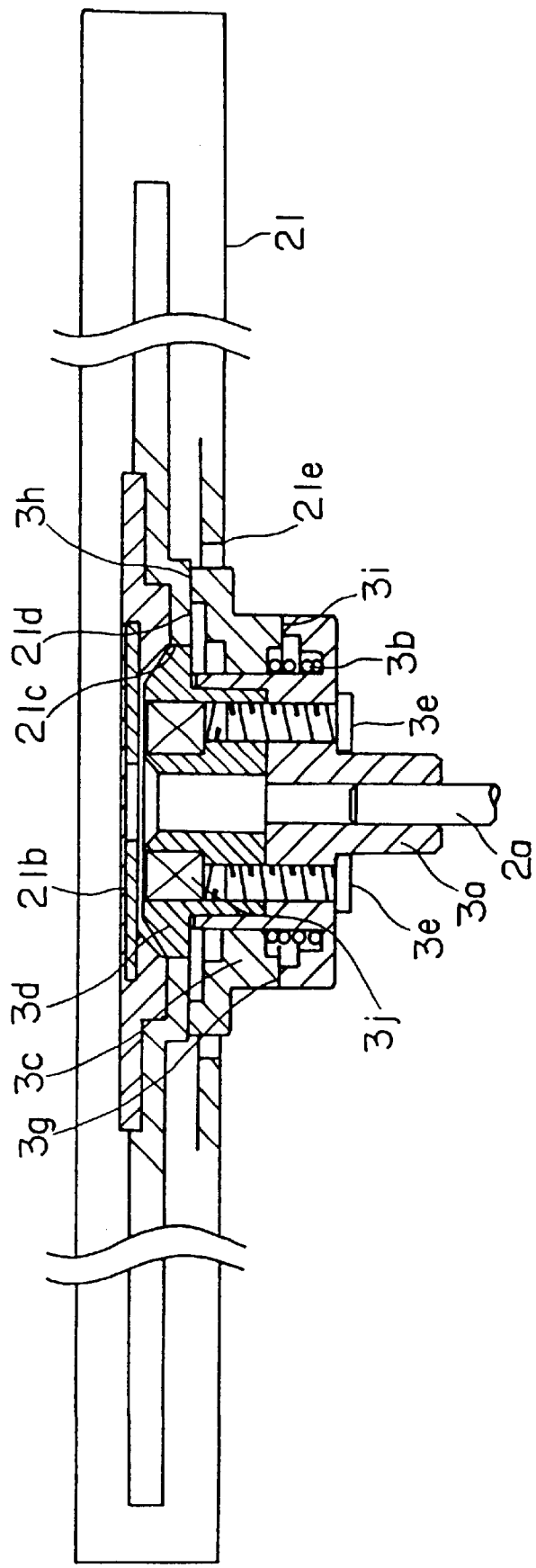
FIG. 20 is a cross sectional view showing the MD loaded state of the optical disk recording and reproducing apparatus.

CD and MD are held in position described as above and as shown in FIGS. 19 and 20. A height difference between the lower surface of the friction member 12k shown in FIG. 19 and the upper surface 3h of the movable member 3c shown in FIG. 20 is made equal to a sum of a height difference between the surface of CD contacting the friction member 12k and the record surface of CD and a height difference between the flange surface of MD and the record surface of MD. As a result, the height of both the record surfaces of CD and MD is the same so that both disks can be reproduced without changing the height of an optical pickup.

Figure 6:
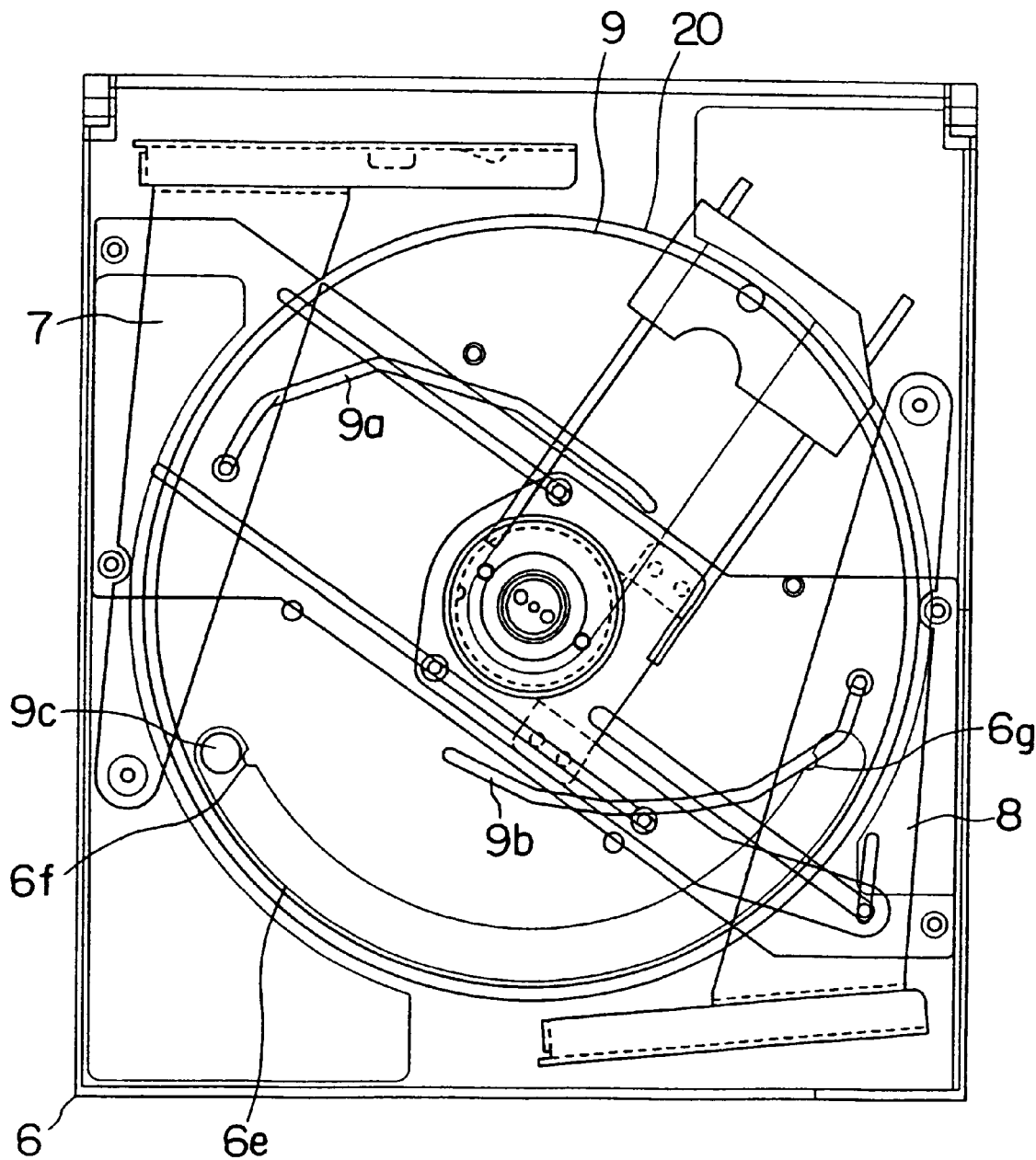
FIG. 6 is a plan view showing some internal parts of the optical disk recording and reproducing apparatus with CD being loaded therein.
Figure 7A:
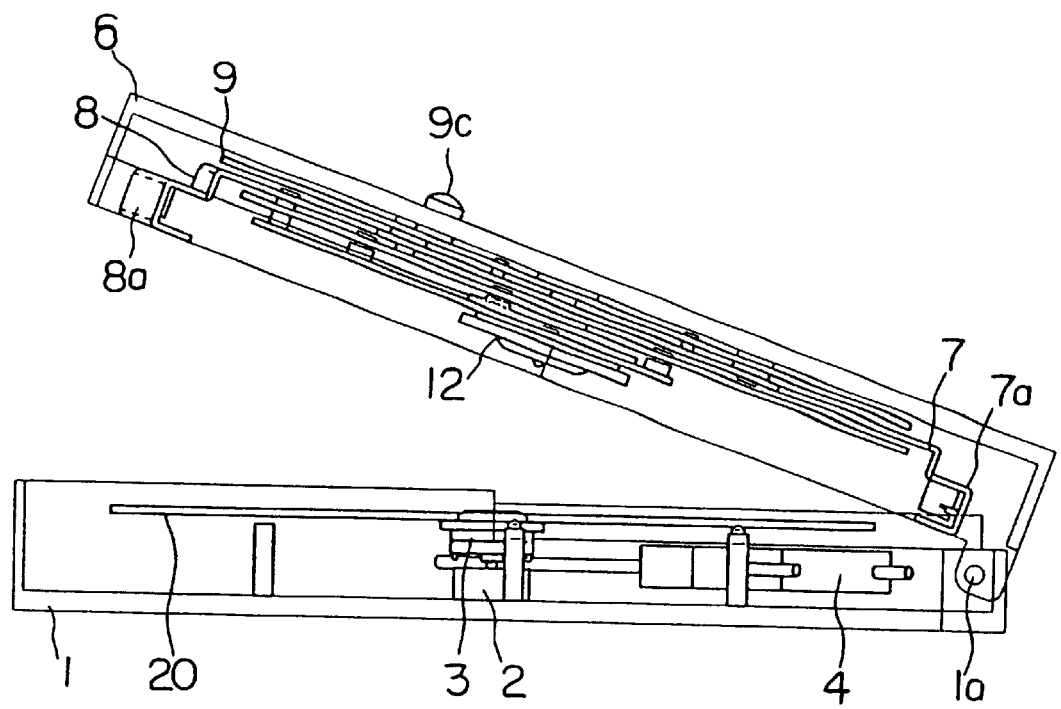
FIG. 7A is a side view showing some internal parts of the optical disk recording and reproducing apparatus with CD being loaded therein and the cover unit being opened.
Figure 7B:
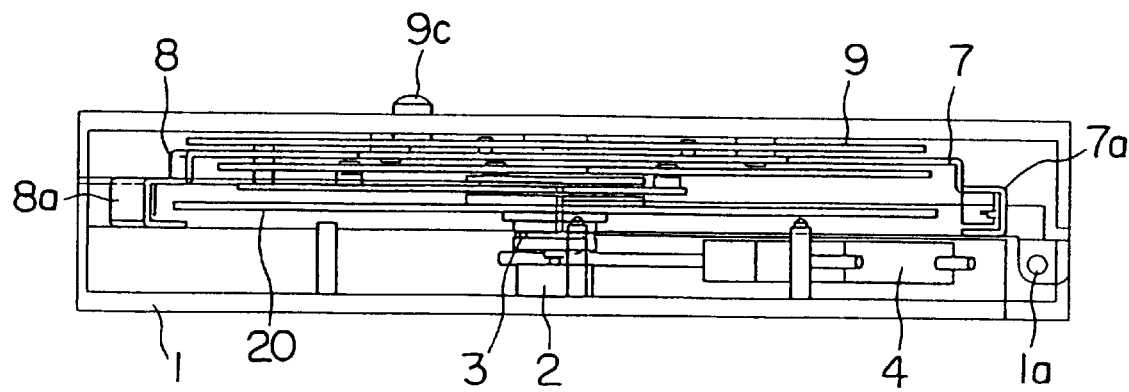
FIG. 7B is a side view showing some internal parts of the optical disk recording and reproducing apparatus with CD being loaded therein and the cover unit being closed.
Figure 8:
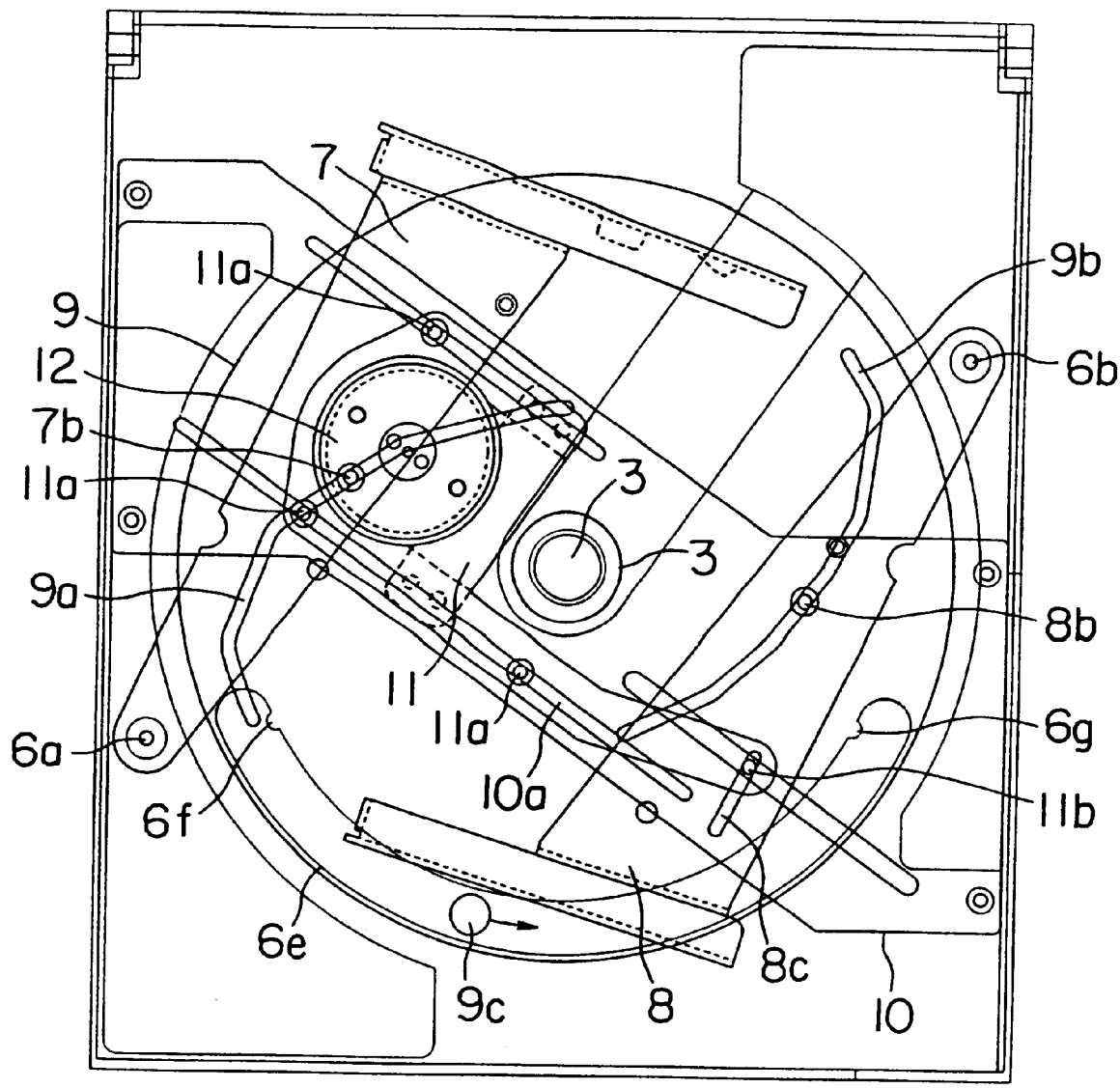
FIG. 8 is a plan view of the optical disk recording and reproducing apparatus showing some internal parts and the intermediate transition from a state able to load CD to a state able to load MD.
Figure 9:
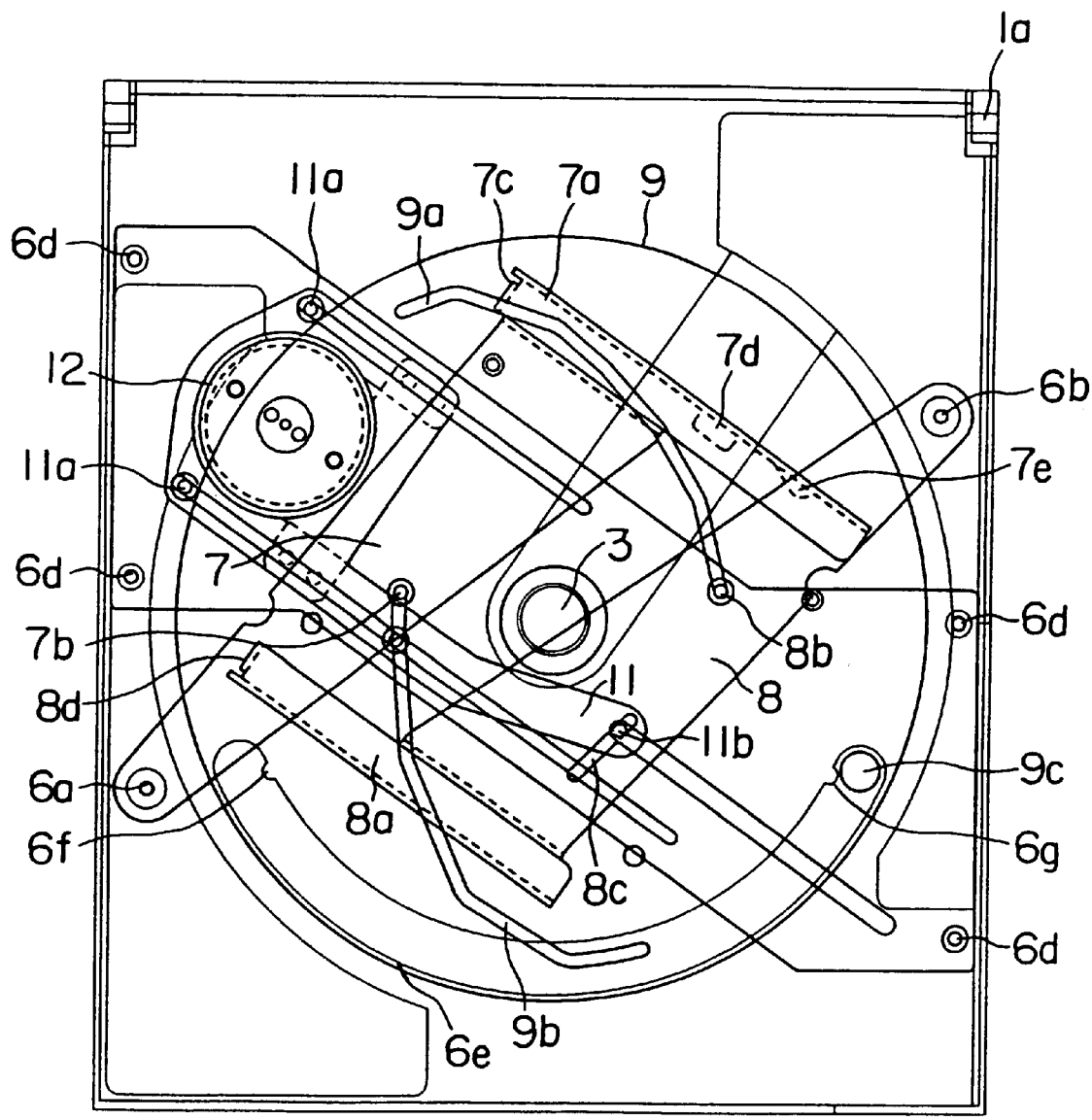
FIG. 9 is a plan view of the optical disk recording and reproducing apparatus showing some internal parts and the state able to load MD.
Figure 10A:
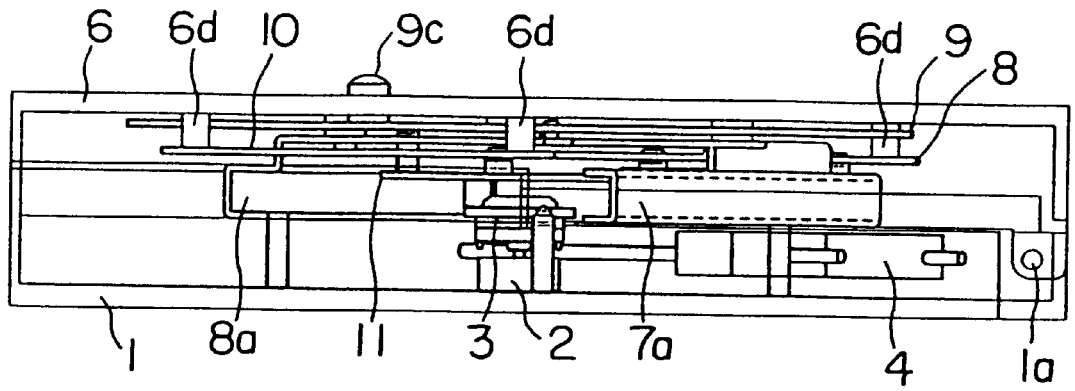
FIG. 10A is a side view of the optical disk recording and reproducing apparatus showing some internal parts and the state able to load MD with the cover unit being closed.
Figure 10B:
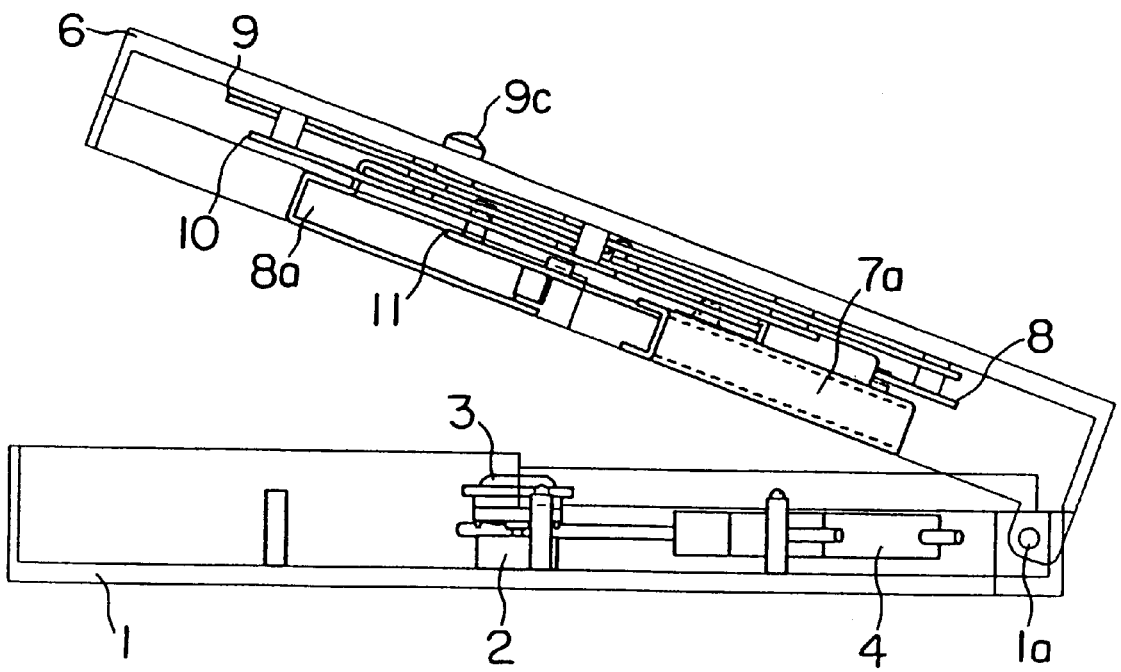
FIG. 10B is a side view of the optical disk recording and reproducing apparatus showing some internal parts and the state able to load MD with the cover unit being opened.

FIG. 6 and FIG. 7B show CD 20 in a reproduction state. In this state, CD can be reproduced. If MD is to be reproduced, the cover unit is opened to pick up CD, and the cam plate 9 is rotated in the counter-clockwise direction as seen in FIG. 44 by rotating the lever 9c. FIG. 8 shows the intermediate state of the cam plate 9 during the rotation. FIG. 9 and FIGS. 10A and 10B show the cam plate 9 rotated to the position allowing MD to be reproduced.

Figure 11:
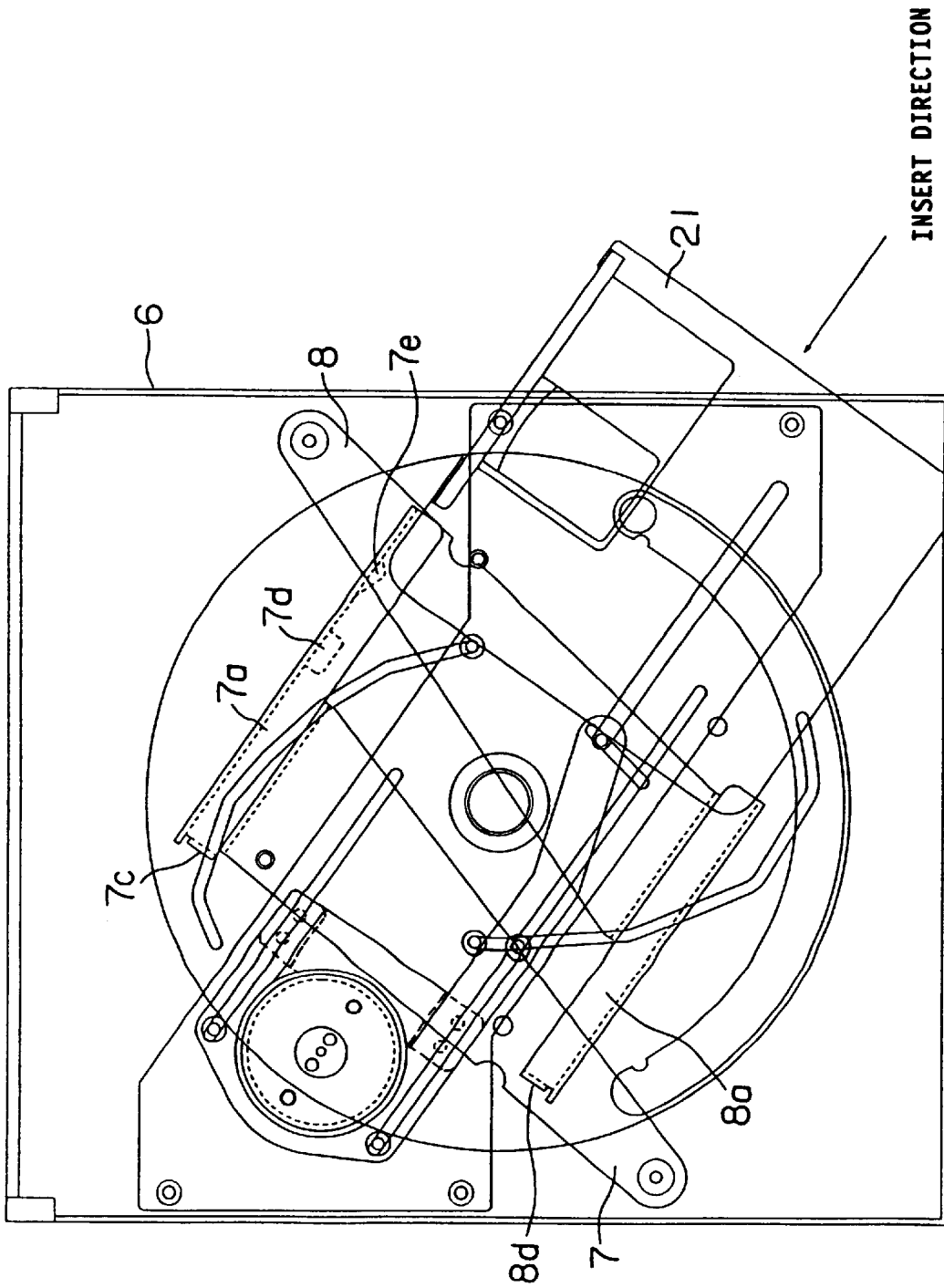
FIG. 11 is a plan view of the optical disk recording and reproducing apparatus showing some internal parts and the intermediate state of MD loading.
Figure 12:
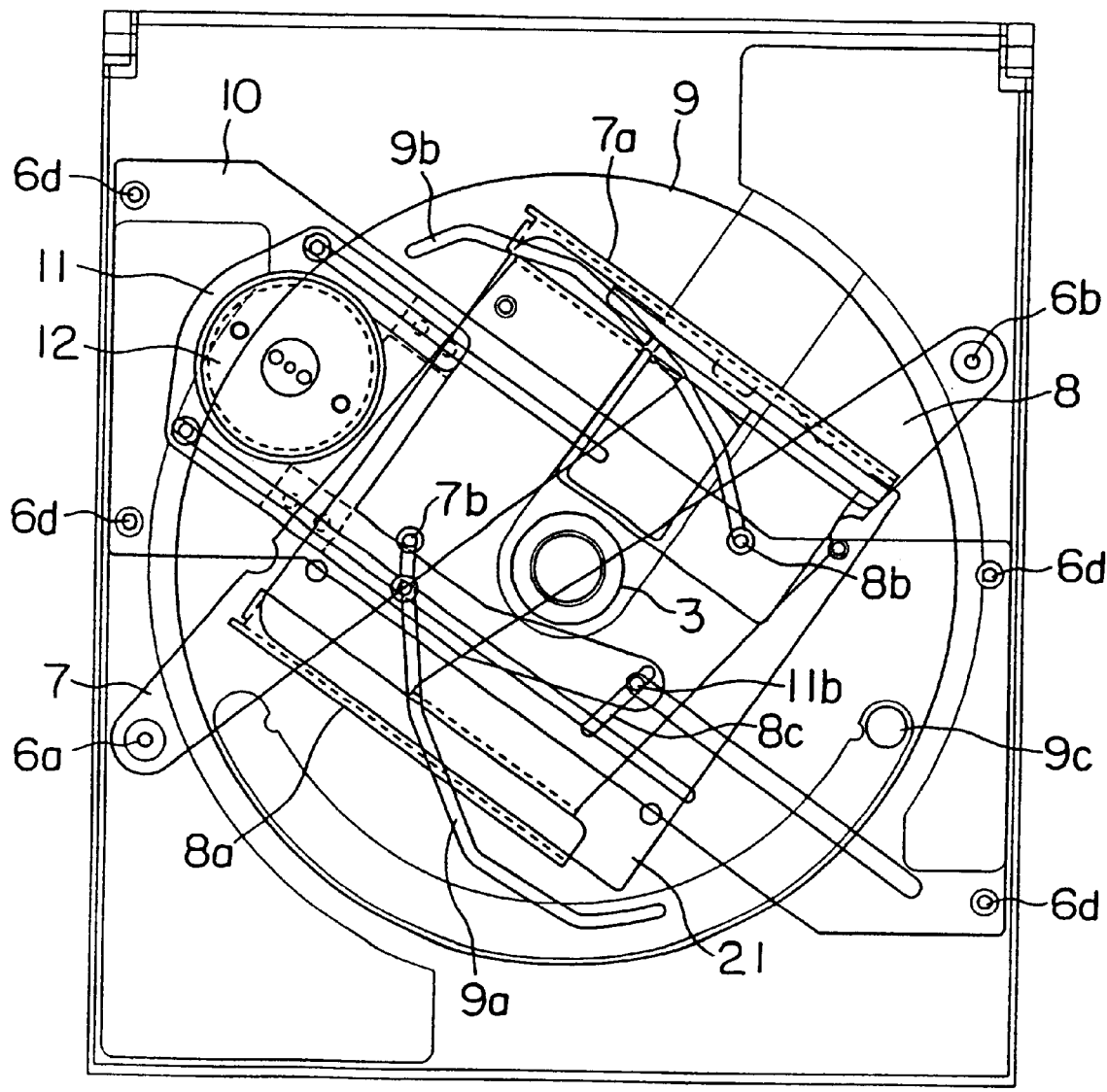
FIG. 12 is a plan view of the optical disk recording and reproducing apparatus showing some internal parts and the MD loaded state.

In this state, the first and second cartridge holding members 7 and 8 are rotated near to each other by the cam plate 9, and the fitting recesses 7a and 8b of the first and second cartridge holding members 7 and 8 are at the positions allowing an MD cartridge to be loaded. FIG. 11 shows an intermediate state of an MD cartridge 21 before it is fully loaded on the first and second cartridge holding members 7 and 8. FIG. 12 shows a state wherein the MD cartridge 21 is fitted in the fitting recesses 7a and 8b and abuts against the stoppers. The clamper 12 is retracted so as not to contact the cartridge 21.

Figure 13A:
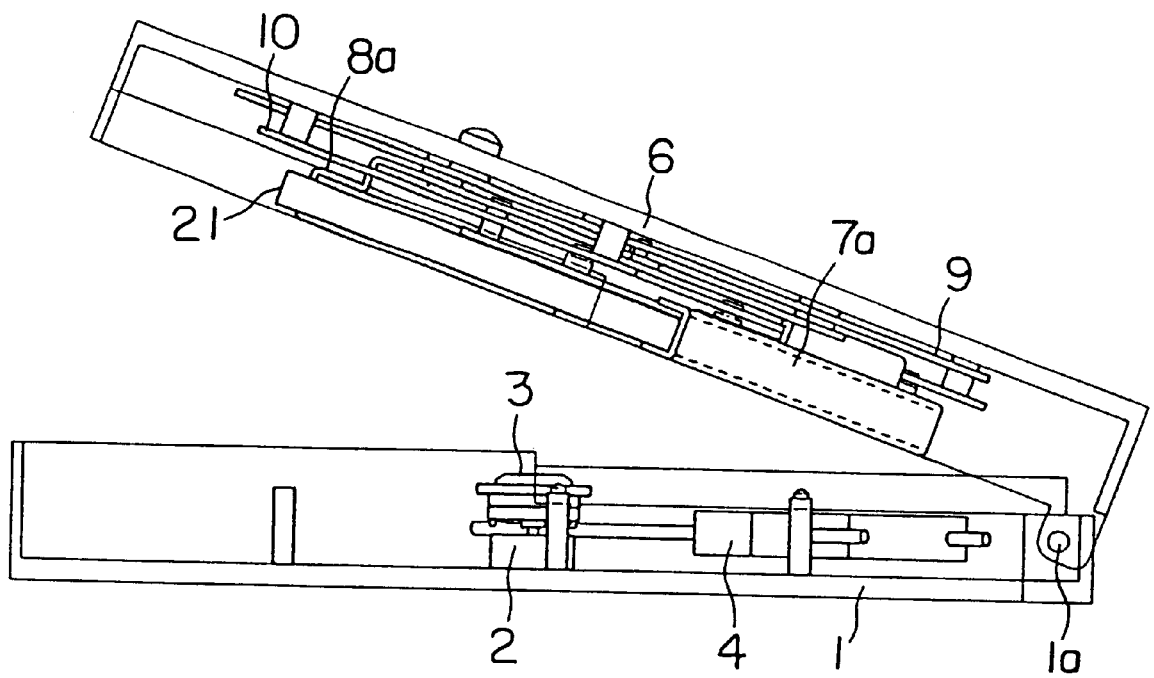
FIG. 13A is a side view of the optical disk recording and reproducing apparatus showing some internal parts and the MD loaded state with the cover unit being opened.
Figure 13B:
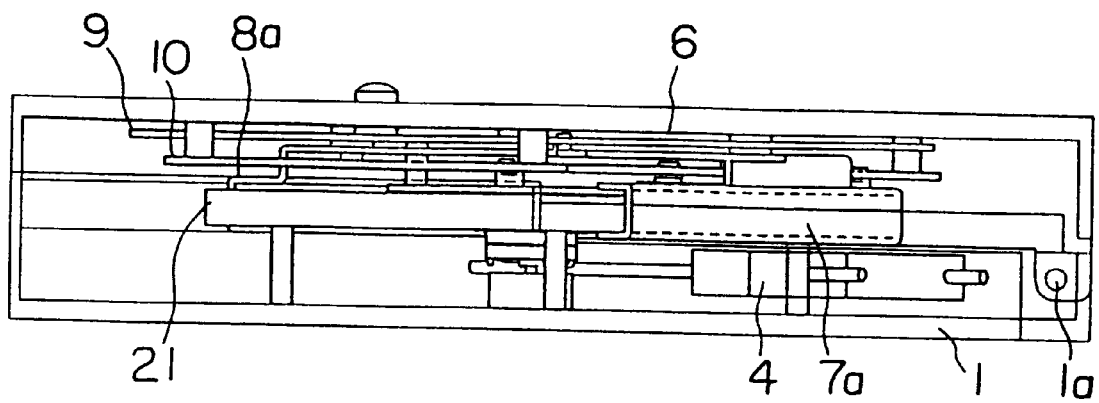

FIG. 13A shows the cartridge 21 held by the first and second cartridge holding members 7 and 8, with the cover unit 6 being opened. As shown in FIG. 13B, as the cover unit 6 is closed, the turntable holds MD as described earlier and stands by for the reproduction of MD. After the reproduction, the cover unit is opened to pick up the cartridge 21. If the cam plate 9 is rotated in the clockwise direction, CD can be reproduced.

FIGS. 21 to 26 illustrate a second embodiment of the invention. Similar to the first embodiment, the cover unit 6 and main unit 1 of the second embodiment include MD and CD holding mechanisms and an optical pickup. In the second embodiment, side frames 13 for supporting the main unit 1 and cover unit 6 are provided. Although one of the side frames 13 is shown in FIGS. 21 to 26, a pair of side frames is provided on both sides of the cover unit 6 and main unit 1.

Shafts 18 and 18 mounted on a cover unit slider 14 engage with slits 13a formed in the side frames 13. The cover unit slider 14 is supported by the side frames 13 to be movable forward and backward and driven by a driver not shown.

Shafts 17 and 17 mounted on a main unit slider 15 engage with slits 13b formed in the side frames 13. The main unit slider 15 is supported by the side frames 13 to be movable forward and backward and driven by a drive not shown.

L-character shaped slits 13c and 13c are formed in the side frames 13. Shafts 16 and 16 mounted on the cover unit 6 engage with the slits 13c and 13c so that the cover unit 6 can move along the slits 13c and 13c. The shafts 16 and 16 also engage with slanted slits 14a formed in the cover unit slider 14 so that the cover unit 6 is driven as the cover unit slider 14 is moved.

Shafts 19 and 19 mounted on the main unit 1 engage with slits 13d formed in the side frames 13. The main unit is supported by the side frames 13 to be movable forward and backward. The shafts 19 and 19 engage with the main unit slider 15 so that the main unit is driven as the main unit slider 15 is moved.

The operation of this embodiment will be described. When MD is to be reproduced, the cover unit slider 14 is moved forward from the initial state shown in FIG. 21. After the cover unit 6 is raised to the position shown in FIG. 22, it is moved forward to the position shown in FIG. 23. When a switch not shown detects that the cover unit 6 reached the position shown in FIG. 23, the cover unit slider 14 stops. In this state, if the slider 9c is at the CD position described with the first embodiment, then it is rotated to the MD position.

Figure 23:
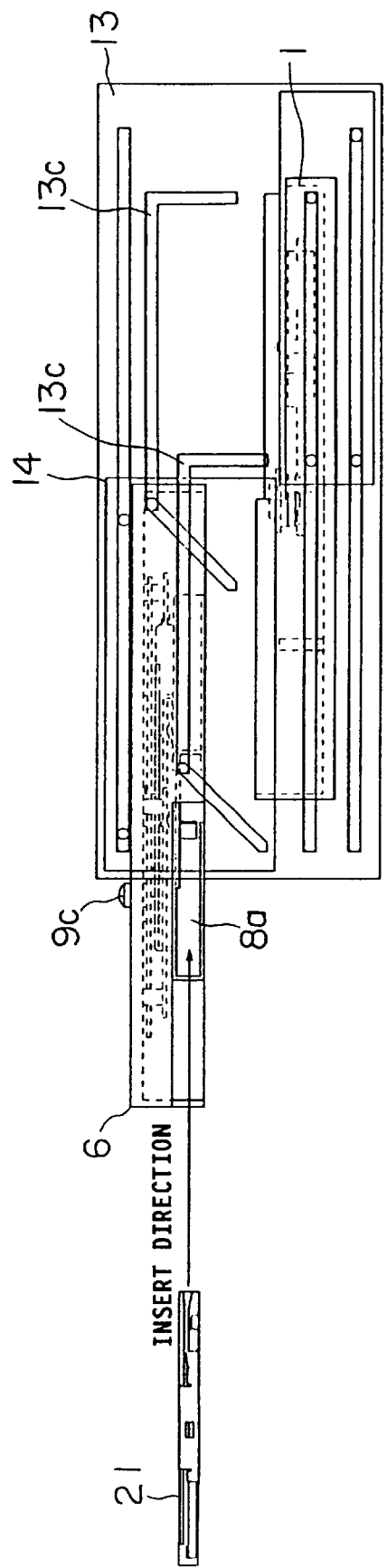
FIG. 23 is a side view showing another state of the optical disk recording and reproducing apparatus of the second embodiment.

As shown in FIG. 23, an MD cartridge 21 is inserted into the fitting recesses 8a and 7a (not shown). When a switch not shown detects that the cartridge 21 was inserted, the cover unit slider 14 moves backward to the position shown in FIG. 21.

Figure 21:
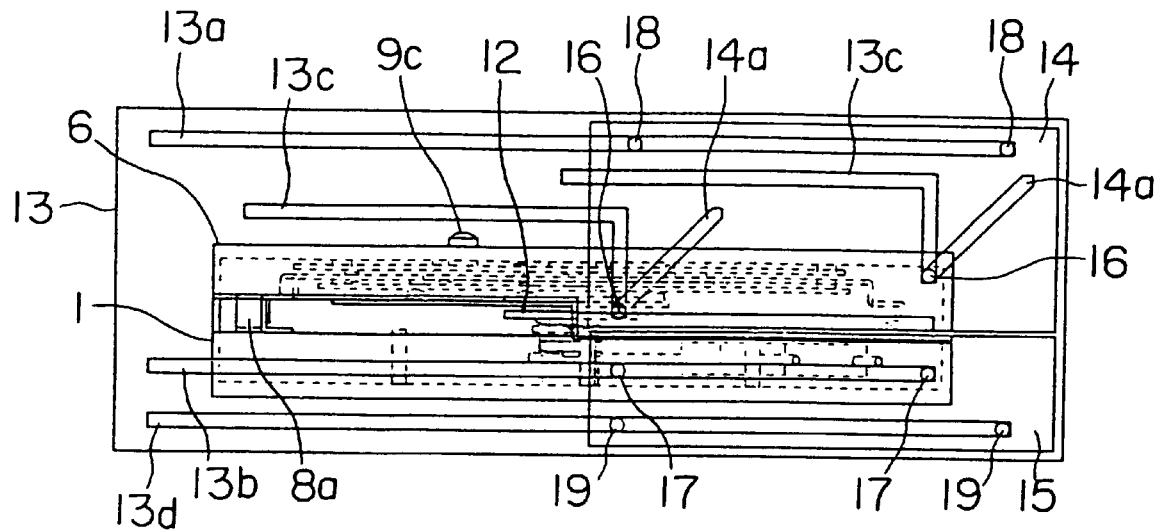
FIG. 21 is a side view showing some internal parts of an optical disk recording and reproducing apparatus according to a second embodiment of the invention.
Figure 22:
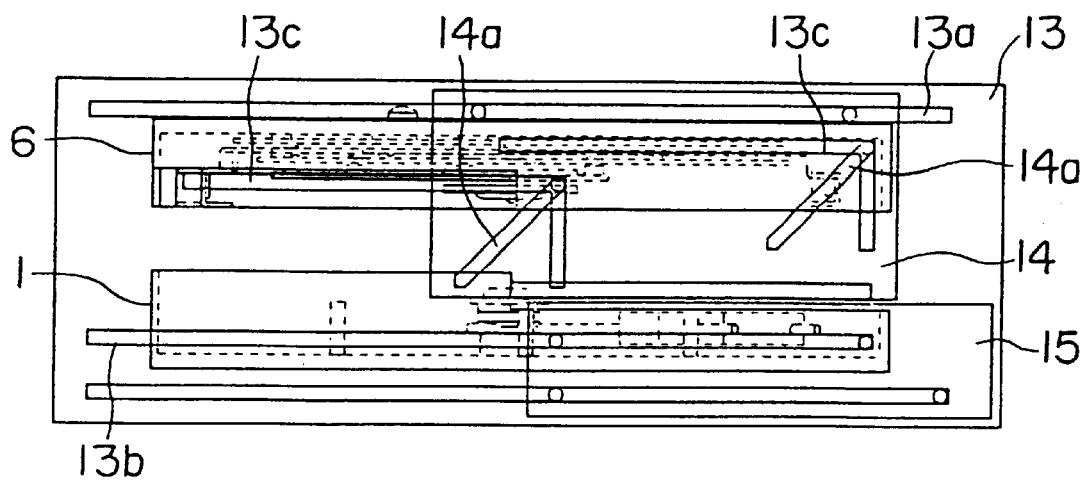
FIG. 22 is a side view showing one state of the optical disk recording and reproducing apparatus of the second embodiment.

When a switch not shown detects that the cover unit 6 moved to the position shown in FIG. 21, the cover unit slider 14 stops. In this state, MD is held by the turntable as described with the first embodiment for the reproduction of MD. After the reproduction, the operations opposite to those described above are performed to take the initial state shown in FIG. 21.

Figure 24:
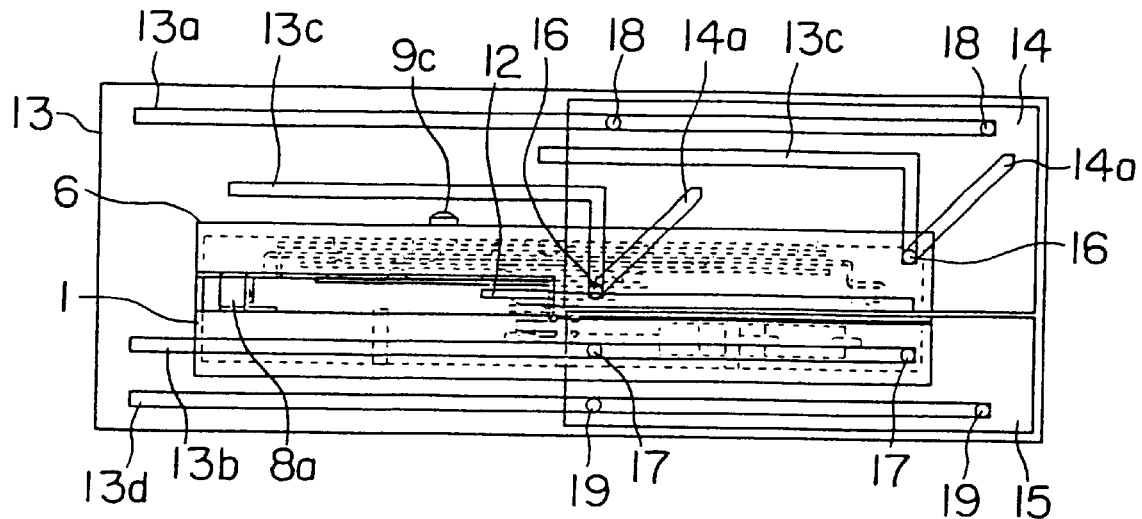
FIG. 24 is a side view showing still another state of the optical disk recording and reproducing apparatus of the second embodiment.
Figure 25:
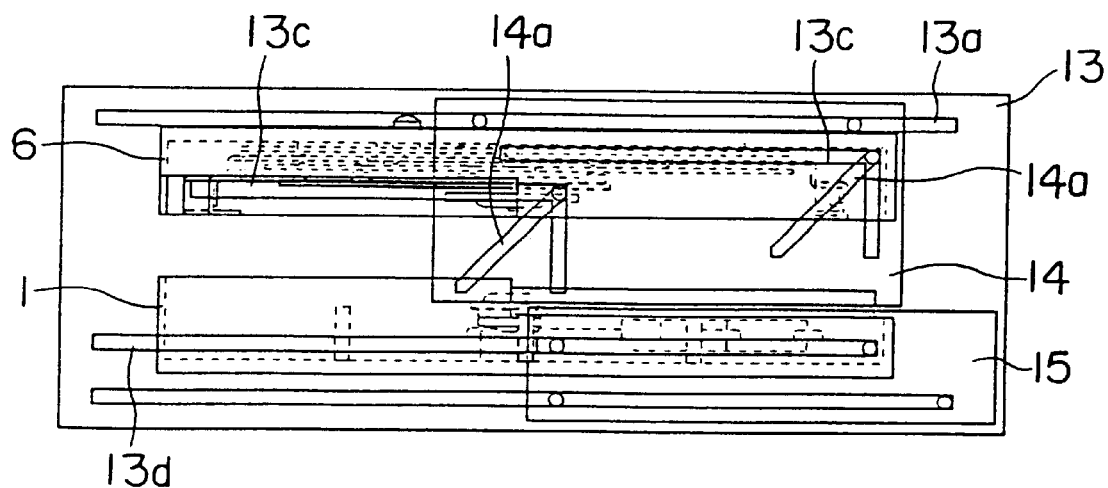
FIG. 25 is a side view showing a further state of the optical disk recording and reproducing apparatus of the second embodiment.

When CD is to be reproduced, the cover unit slider 14 is moved forward from the initial state shown in FIG. 24. When a switch not shown detects that the cover unit 6 reached the position shown in FIG. 25, the cover unit slider 14 stops.

Figure 26:
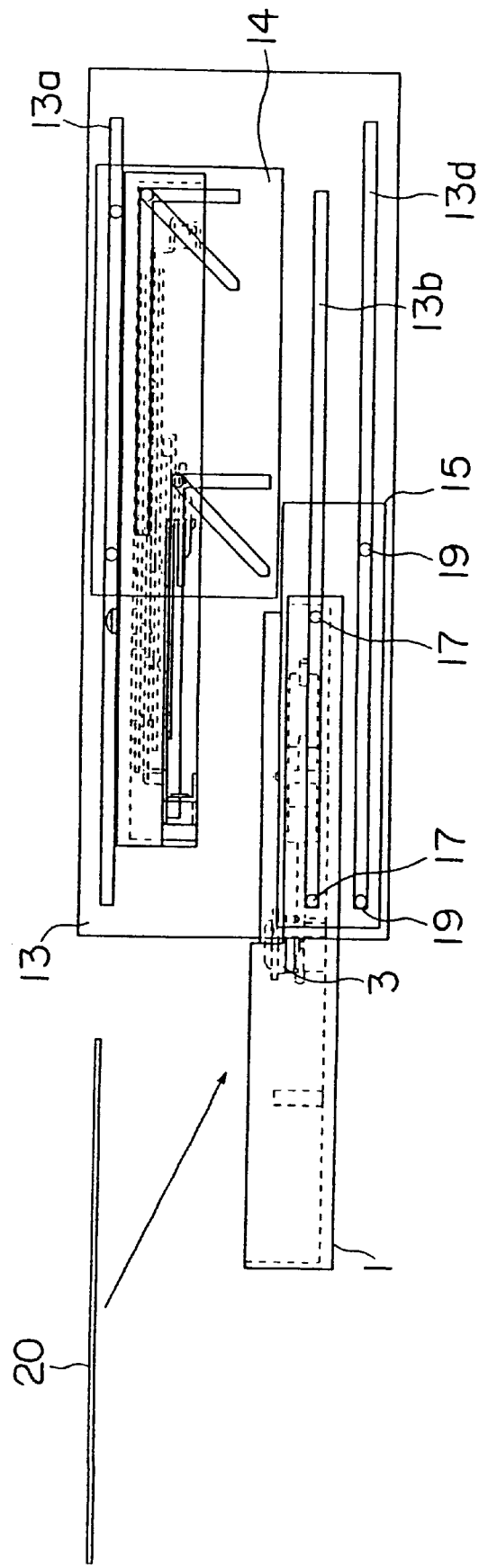
FIG. 26 is a side view showing a still further state of the optical disk recording and reproducing apparatus of the second embodiment.

Then, the main unit slider 15 moves forward. When a switch not shown detects that the main unit 1 reached the position shown in FIG. 26, the main unit slider 15 stops. In this state, CD 20 is placed on the turntable 3 as shown in FIG. 26.

When a switch not shown detects that CD was placed on the turntable, the main unit slider 15 moves backward. When a switch not shown detects that the main unit 1 reached the position shown in FIG. 25, the main unit slider 15 stops. Then, the cover unit slider 14 is moved from the position shown in FIG. 25 to the position shown in FIG. 24.

In this state, CD is held by the turntable and clamper as described with the first embodiment for the reproduction of CD. After the reproduction, the operations opposite to those described above are performed to take the initial state shown in FIG. 24.

According to this invention, both CD and MD can be reproduced by using the same disk motor, turntable, and optical pickup. It is possible to realize a compact optical disk recording and reproducing apparatus compatible with CD and MD.

What is claimed is:

1. An optical disk recording/reproducing apparatus for recording and reproducing a stand alone first optical disk and a second optical disk housed in a cartridge, the diameter of said first optical disk being larger than any dimension of the cartridge of said second optical disk, comprising:

a turntable and a pickup operative with said first and second optical disks set at a recording/reproducing position on the top surface of said turntable;

holding means (7, 8) for holding the cartridge of said second disk to set said second optical disk at the recording/reproducing position and being retractable in the direction parallel to the top surface of the turntable, said first optical disk being free from mechanical interference from said holding means when said first optical disk is set at the recording/reproducing position; and a clamper (12) for abutting against said turntable through said first optical disk to clamp said first optical disk to said turntable when said first optical disk is reproduced and being retractable in the direction parallel to the top surface of said turntable, the cartridge of said second optical disk being free from mechanical interference from said clamper when said cartridge is set at the recording/reproducing position when said second optical disk is reproduced.

2. The apparatus according to claim 1 further comprising movable drive means (9) for mechanically linking to both of said holding means and said clamper so that the retracting operations of said holding means and said clamper are simultaneously performed by moving said drive means.

3. The apparatus according to claim 2, wherein said drive means has a portion which can be manually operated to move said drive means to retract both of said holding means and said clamper.

4. The apparatus according to claim 2, wherein said drive means includes a circular plate and the mechanical links between said driving means and both of said holding means and clamper are made by pairs of slots and pins so that the retracting operations of said holding means and said clamper are performed by rotating the circular plate.

5. The apparatus according to claim 1, wherein said holding means includes two separated holding bars (7a, 8a) which are shifted to face each other with a predetermined width approximately equal to the width of the cartridge of said second optical disk to hold the cartridge of said second optical disk between said two holding bars when said second optical disk is set at the recording/reproducing position, and shifted to retract from the facing position so as not to interfere with said first optical disk when said first optical disk is set at the recording/reproducing position.

6. The apparatus according to claim 5 further comprising a square housing (6), said two holding bars (7a, 8a) are arranged in an oblique direction to the sides of the square housing when holding the cartridge of said second optical disk.

7. An optical disk recording and reproducing apparatus for recording/reproducing a stand alone first optical disk and a second optical disk housed in a cartridge of a generally rectangle shape, the diameter of said first optical disk being larger than any dimension of the cartridge of said second optical disk, comprising:

a housing having a top, a bottom, and at least one linear side surface extending between said top and said bottom;

a turntable and a pickup operable with said first and second optical disks set at a recording/reproducing position on the top surface of said turntable; and holding means (7, 8) for holding between two holding bars (7a, 8a) the opposite sides of the rectangular cartridge of said second disk set at the recording/reproducing position, wherein said holding bars holding the rectangular cartridge of said second optical disk are aligned at nearly 45° to said at least one linear side surface so that the opposite sides of the held cartridge are at nearly 45° to said at least one linear side surface and said pickup is arranged to travel in a direction aligned at an angle of nearly 45° to said at least one linear side surface during recording/reproducing operations.

8. The apparatus according to claim 7, wherein said holding bars (7a, 8a) are shifted from a retracting position to parallely face each other with a predetermined width approximately equal to the width of the cartridge of said second optical disk to hold the cartridge of said second optical disk between said two holding bars when said second optical disk is set at the recording/reproducing position, and are shifted to retract from the facing position such that said first optical disk is free from any interference therefrom when said first optical disk is set at the recording/reproducing position.

9. The apparatus according to claim 8, wherein the two holding bars parallely facing each other to hold the cartridge of said second optical disk are aligned substantially in the direction of a diagonal line of the housing frame of the apparatus.

10. The apparatus according to claim 9, wherein the two holding bars retracting from the facing position are aligned parallel to the opposite sides of the housing frame of the apparatus.

11. The apparatus according to claim 10, wherein said holding means comprises two members, each including a lever portion at one end of which the holding bar is formed and the other end of which is rotatably fixed on an axis (6a, 6b) so that the holding bars face each other and retract from the facing position by respectively rotating the lever portions about the axes.

* * * * *